US012124272B2

(12) United States Patent
Knutson et al.

(10) Patent No.: US 12,124,272 B2
(45) Date of Patent: Oct. 22, 2024

(54) VEHICLE LOCATION INFORMATION CORRECTION BASED ON ANOTHER VEHICLE

(71) Applicant: Aptiv Technologies AG, Schaffhausen (CH)

(72) Inventors: Eric Paul Knutson, Kokomo, IN (US); David Martin Spell, Kokomo, IN (US); Linh Pham, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 39 days.

(21) Appl. No.: 17/070,312

(22) Filed: Oct. 14, 2020

(65) Prior Publication Data

US 2022/0113740 A1   Apr. 14, 2022

(51) Int. Cl.
  *G05D 1/00*   (2024.01)
  *G01S 19/41*   (2010.01)

(52) U.S. Cl.
  CPC ............ *G05D 1/0278* (2013.01); *G01S 19/41* (2013.01); *G05D 1/028* (2013.01)

(58) Field of Classification Search
  CPC ........ G01S 19/41; G01S 13/86; G01S 19/396; G01S 19/40; G01S 5/0072; G05D 1/028; G05D 1/0278; G05D 2201/0213
  See application file for complete search history.

(56) References Cited

U.S. PATENT DOCUMENTS

| | | | |
|---|---|---|---|
| 9,235,923 B1 * | 1/2016 | Robinson | G06T 17/05 |
| 9,596,570 B1 * | 3/2017 | Cardoso de Moura | H04L 67/52 |
| 9,738,222 B2 * | 8/2017 | Hathaway | B60Q 9/008 |
| 10,094,906 B2 | 10/2018 | Vijaya Kumar et al. | |
| 10,380,451 B2 * | 8/2019 | Falb | G06V 20/56 |
| 10,697,775 B2 * | 6/2020 | Noguchi | G07B 15/06 |
| 11,265,939 B2 * | 3/2022 | Gagne | H04W 76/14 |
| 2017/0031031 A1 * | 2/2017 | Wagner | G01C 22/00 |
| 2019/0329791 A1 * | 10/2019 | Oba | B60K 28/063 |
| 2020/0045517 A1 * | 2/2020 | Park | H04W 4/12 |
| 2020/0191978 A1 * | 6/2020 | Stählin | G01S 19/43 |
| 2020/0234574 A1 * | 7/2020 | Park | G08G 1/0133 |

\* cited by examiner

*Primary Examiner* — Khoi H Tran
*Assistant Examiner* — Christopher Scott
(74) *Attorney, Agent, or Firm* — Harness, Dickey & Pierce, P.L.C.

(57) ABSTRACT

A system for determining vehicle location information includes a receiver supported on a first vehicle for receiving a communication from a second vehicle and a signal from each of a plurality of satellites. A detector is configured to detect a positional relationship between the first vehicle and the second vehicle. A processor is configured to determine a location of the first vehicle from received satellite signals, a location of the second vehicle based on the communication received from the second vehicle, a corrected location of the first vehicle based on the location of the second vehicle and the positional relationship between the vehicles, and a corrective mapping of a plurality of sections of a field of view of the receiver. Each section has ad correction factor for correcting a subsequently determined location of the first vehicle based on satellite signals received from satellites appearing in the respective sections.

20 Claims, 4 Drawing Sheets

VEHICLE LOCATION INFORMATION CORRECTION BASED ON ANOTHER VEHICLE

BACKGROUND

Modern automotive vehicles include an increasing amount of electronic technology, such as sensors or detectors that provide driver assistance or autonomous vehicle control. Information regarding the movement or heading direction of the vehicle is useful or necessary for such assistance or control. There are various ways to obtain such information. For example GNSS satellite technology allows for determining and tracking vehicle movement or direction information based on detecting multiple satellites and using known algorithms. There are circumstances, however, in which the satellite signals may not allow for a location determination with a desired accuracy. For example, atmospheric delays can introduce differential error that affects the pseudo range determined from a satellite, which introduces inaccuracies into a location determination.

SUMMARY

An illustrative example embodiment of a system for determining vehicle location information includes at least one receiver that is configured to be supported on a first vehicle. The receiver is configured to receive a communication from a second vehicle and a signal from each of a plurality of satellites. At least one detector is supported on the first vehicle. The detector is configured to detect a positional relationship between the first vehicle and the second vehicle. At least one processor is associated with the first vehicle and is configured to determine a location of the first vehicle based on satellite signals received by the receiver, a location of the second vehicle based on the communication received from the second vehicle, a corrected location of the first vehicle based on the location of the second vehicle and the positional relationship between the first vehicle and the second vehicle, and a corrective mapping of a plurality of sections of a field of view of the receiver. Each of the sections has an associated correction factor that the processor uses for correcting a subsequently determined location of the first vehicle based on satellite signals received from satellites appearing in the respective sections.

In an example embodiment having at least feature of the system of the previous paragraph, the associated correction factor for a first one of the sections is different than the associated correction factor for a second one of the sections.

In an example embodiment having at least feature of the system of any of the previous paragraphs, the at least one receiver comprises a first antenna for receiving the communication from the second vehicle and a second antenna for receiving the signal from each of the plurality of satellites; and the corrective mapping is for the field of view of the second antenna.

In an example embodiment having at least feature of the system of any of the previous paragraphs, the communication from the second vehicle includes an indication of: the location of the second vehicle, a reliability of the location of the second vehicle, a speed of the second vehicle, a size of the second vehicle, and a shape of at least a portion of the second vehicle.

In an example embodiment having at least feature of the system of any of the previous paragraphs, the communication from the second vehicle comprises a basic safety message (BSM) that includes an indication of a reliability of the location of the second vehicle.

In an example embodiment having at least feature of the system of any of the previous paragraphs, the at least one detector comprises at least one of a RADAR detector, a LIDAR detector, a vision based detector, or an ultrasound detector.

In an example embodiment having at least feature of the system of any of the previous paragraphs, the at least one processor updates the corrective mapping based on a subsequently determined location of the first vehicle based on subsequently received satellite signals, a subsequently determined location of the second vehicle based on a subsequently received communication from the second vehicle, and a subsequently determined corrected location of the first vehicle; and replaces the corrective mapping with the updated corrective mapping.

In an example embodiment having at least feature of the system of any of the previous paragraphs, the at least one processor either updates or dismisses the corrective mapping within a predetermined time.

In an example embodiment having at least feature of the system of any of the previous paragraphs, the associated correction factors each have a value; the value of the associated correction factor varies across the respective section; the value of the associated correction factor for a first one of the sections gradually changes toward a value of the associated correction factor for a second one of the sections near a transition between the first one of the sections and the second one of the sections; and the second one of the sections is adjacent the first one of the sections.

In an example embodiment having at least feature of the system of any of the previous paragraphs, the at least one processor determines whether the second vehicle is within a predetermined range of the first vehicle as a prerequisite to using the received communication from the second vehicle.

An illustrative example embodiment of a method of determining location information of a first vehicle includes: receiving a communication from a second vehicle; receiving a signal from each of a plurality of satellites by at least one receiver associated with the first vehicle; detecting a positional relationship between the first vehicle and the second vehicle; determining a location of the first vehicle based on the received satellite signals; determining a location of the second vehicle based on the received communication; determining a corrected location of the first vehicle based on the location of the second vehicle and the positional relationship between the first vehicle and the second vehicle; and determining a corrective mapping of a plurality of sections of a field of view of the at least one receiver, each of the sections having an associated correction factor for correcting a subsequently determined location of the first vehicle based on satellite signals received from satellites appearing in the respective sections.

In an example embodiment having at least feature of the method of the previous paragraph, the associated correction factor for a first one of the sections is different than the associated correction factor for a second one of the sections.

In an example embodiment having at least feature of the method of any of the previous paragraphs, the communication from the second vehicle includes an indication of: the location of the second vehicle, a reliability of the location of the second vehicle, a speed of the second vehicle, a size of the second vehicle, and a shape of at least a portion of the second vehicle.

In an example embodiment having at least feature of the method of any of the previous paragraphs, the communication from the second vehicle comprises a basic safety message (BSM) that includes an indication of a reliability of the location of the second vehicle.

An example embodiment having at least feature of the method of any of the previous paragraphs includes updating the corrective mapping based on a subsequently determined location of the first vehicle based on subsequently received satellite signals, a subsequently determined location of the second vehicle based on a subsequently received communication from the second vehicle, and a subsequently determined corrected location of the first vehicle; and replacing the corrective mapping with the updated corrective mapping.

An example embodiment having at least feature of the method of any of the previous paragraphs includes either updating or dismissing the corrective mapping within a predetermined time.

In an example embodiment having at least feature of the method of any of the previous paragraphs, the associated correction factors each have a value; the value of the associated correction factor varies across the respective section; the value of the associated correction factor for a first one of the sections gradually changes toward a value of the associated correction factor for a second one of the sections near a transition between the first one of the sections and the second one of the sections; and the second one of the sections is adjacent the first one of the sections.

An example embodiment having at least feature of the method of any of the previous paragraphs includes determining whether the second vehicle is within a predetermined range of the first vehicle as a prerequisite to using the received communication from the second vehicle.

Another illustrative example embodiment of a system for determining vehicle location information includes: receiver means, configured to be supported on a first vehicle, for receiving a communication from a second vehicle and a signal from each of a plurality of satellites; detector means, supported on the first vehicle, for detecting a positional relationship between the first vehicle and the second vehicle; and means, associated with the first vehicle, for determining: a location of the first vehicle based on satellite signals received by the receiver means, a location of the second vehicle based on the communication received by the receiver means, a corrected location of the first vehicle based on the location of the second vehicle and the positional relationship between the first vehicle and the second vehicle, and a corrective mapping of a plurality of sections of a field of view of the receiver means, each of the sections having an associated correction factor that the means for determining uses for correcting a subsequently determined location of the first vehicle based on satellite signals received from satellites appearing in the respective sections.

In an example embodiment having at least feature of the system of the previous paragraph, the means for determining is further for determining whether the second vehicle is within a predetermined range of the first vehicle as a prerequisite to using the received communication from the second vehicle; and either updating or dismissing the corrective mapping within a predetermined time.

The various features and advantages of at least one disclosed example embodiment will become apparent to those skilled in the art from the following detailed description. The drawings that accompany the detailed description can be briefly described as follows.

DETAILED DESCRIPTION

Figure 1:
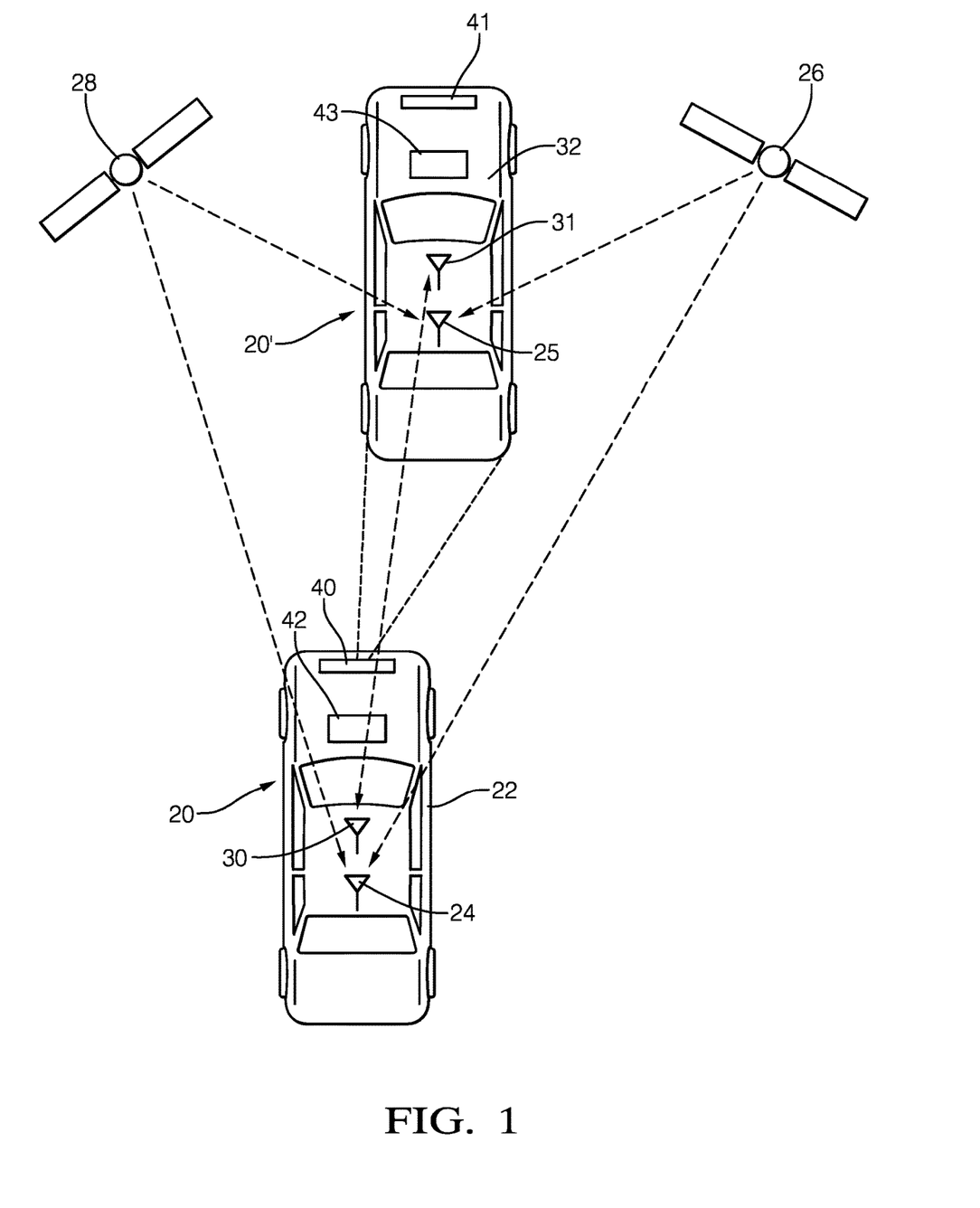
FIG. 1 schematically illustrates an example system for determining vehicle location information.

FIG. 1 schematically illustrates a system 20 on a first vehicle 22 for determining vehicle location information. The system 20 includes at least one receiver including at least one antenna 24 that is configured for receiving a signal from each of a plurality of satellites 26 and 28. Two satellites are illustrated for discussion purposes. In many circumstances, signals from more than two satellites will be received by the antenna 24. The example receiver includes another antenna 30 that is configured for receiving communications from a second vehicle 32. The receivers are transceivers in the illustrated embodiment, which include two-way communication capability. The communications received by the antenna 30 are vehicle-to-vehicle (V2V) communications, cellular vehicle to vehicle (C-V2V) communications or dedicated short range communications (DSRC).

The system 20 associated with the first vehicle 22 includes at least one detector 40 that is configured for detecting a positional relationship between the first vehicle 22 and the second vehicle 32. The detector 40 in some embodiments includes a RADAR detector. In other embodiments the detector 40 includes a LIDAR detector, an ultrasound detector, or a vision based detector.

A processor 42 receives an indication regarding the detected satellite signals, the communication from the second vehicle 32 and the detected positional relationship between the vehicles 22 and 32. The processor 42 determines vehicle location information regarding the location of the first vehicle 22 based on those indications. The processor 42 is capable of correcting potential inaccuracies in the location of the first vehicle 22 that may occur if only the satellite signals received by the antenna 24 are used for determining the location of the first vehicle 22.

The second vehicle 32 includes a system 20' that is functionally the same as the system 20 on the first vehicle 22. In the illustrated example, the system 20' includes a receiver comprising an antenna 25 configured for receiving a signal from the satellites 26 and 28. Another receiver portion includes an antenna 31 configured for vehicle-to-vehicle communications. A detector 41 is like the detector 40 and a processor 43 is like the processor 42.

Figure 2:
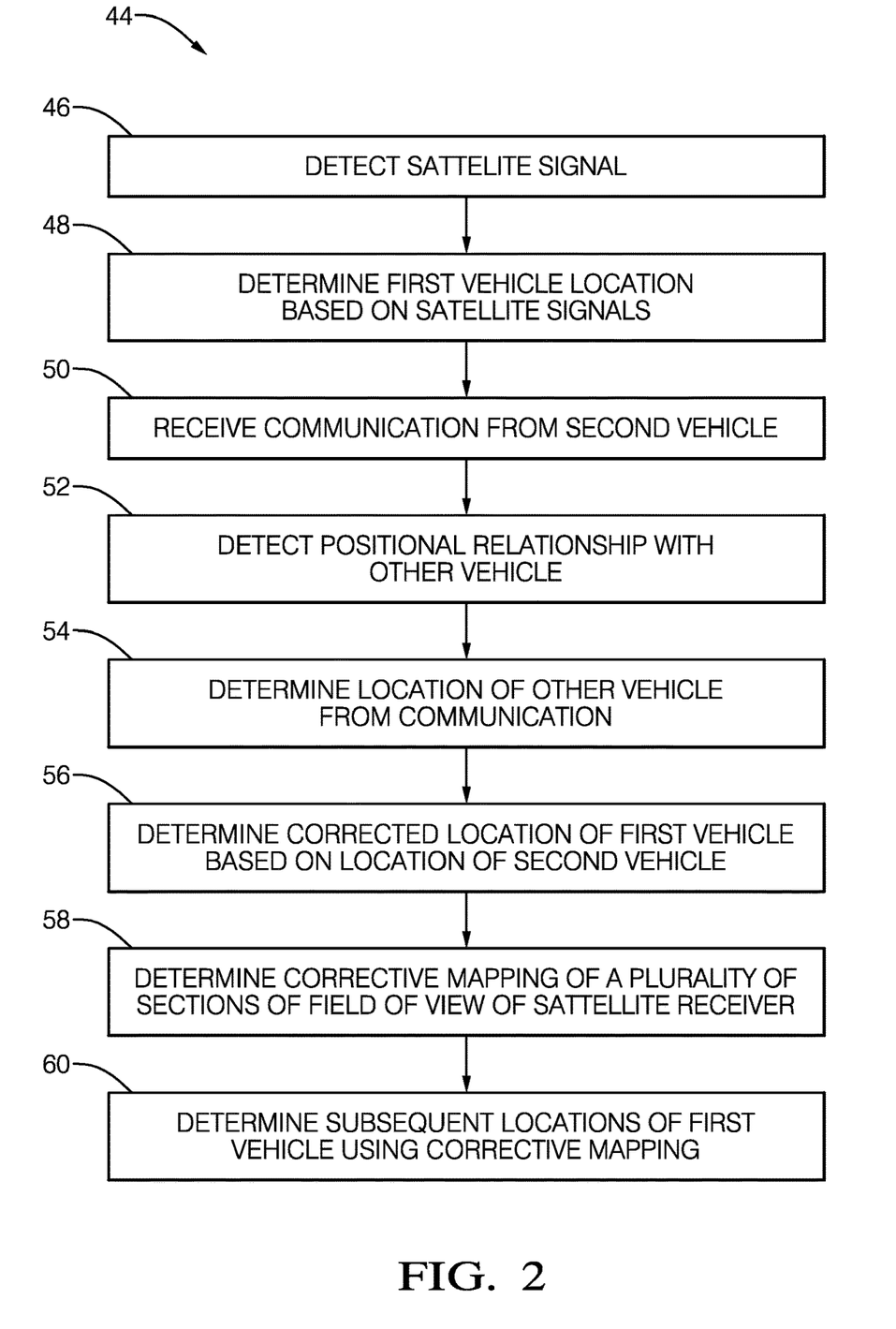
FIG. 2 is a flow chart diagram summarizing an example method of determining vehicle location information.

FIG. 2 includes a flowchart diagram 44 that summarizes an example approach for determining vehicle location information. At 46, the receiver of the system 20 detects the satellite signals through the antenna 24, for example. At 48, the processor 42 determines a first vehicle location, which is the location of the first vehicle 22 in the example of FIG. 1, based on the detected satellite signals.

At 50, the system 20 receives a communication from the second vehicle 32 in the example of FIG. 1, through the antenna 30, for example. In the illustrated example, the communication from the second vehicle 32 is a V2X basic safety message (BSM). The communication from the second vehicle 32 includes information regarding a GNSS location of the second vehicle 32, a current speed of the second vehicle 32, a size of the second vehicle 32, a shape of the second vehicle 32, and an indication of a quality of the GNSS location information. The indication of the quality of the GNSS location information is utilized by the processor 42 to determine whether to utilize the communication from the second vehicle 32 for purposes of potentially correcting the location information for the first vehicle 22. At various times different vehicles including a system designed according to an embodiment like that shown in FIG. 1, will be able to provide accurate or reliable vehicle location information that can be useful to facilitate accurately locating other vehicles.

At 52, the detector 40 provides information to the processor 42 for determining a positional relationship between the first vehicle 22 and the second vehicle 32. The information within the communication received at 50 allows the processor 42 associated with the first vehicle 22 to use the information from the detector 40 for making an accurate determination of the relative positions or the positional relationship between the vehicles 22 and 32.

The processor 42 is configured to determine that the second vehicle 32 is within an appropriate distance from the first vehicle 22 as a prerequisite to using the communication from the second vehicle 32. Assuming that the information from the second vehicle 32 is determined to be reliable, the processor 42 determines the location of the second vehicle 32 at 54. In other words, the processor 42 makes a determination at 54 whether to accept and rely upon the GNSS location information within the communication received from the second vehicle 32.

At 56, the processor 42 determines a corrected location of the first vehicle 22 based on the location of the second vehicle 32 and the positional relationship between the vehicles 22 and 32. If, for example, the detected satellite signals received by the receiver of the system 20 associated with the vehicle 22 are subject to atmospheric delays, the pseudo ranges determined by the processor 42 based on those signals may not provide a precise or accurate location of the first vehicle 22. Given that the GNSS location information from the second vehicle 32 and the relative positions between the vehicles 22 and 32, the processor 42 is able to correct, if necessary, the location of the first vehicle 22 based on that information.

The detector 40 provides information regarding vehicle dynamics of the second vehicle 32. The processor 42 translates absolute position information from the communication received from the second vehicle 32 into relative position information. The processor 42 uses any positional variance between the two positions as a basis to determine a positional offset to apply to the determined position of the first vehicle 22. The positional offset is useful to correct various potential positional errors in a satellite signal-based determination of the location of the first vehicle 22 because the GNSS dynamics for both of the vehicles 22 and 32 are nearly the same. Both vehicles 22 and 32 are following essentially the same path and there is a relatively small distance between them. Under such circumstances the positional offset information allows for using the position information regarding the second vehicle 32 for correcting any errors in the satellite-based position of the first vehicle 22.

At 58, the processor 42 determines a corrective mapping of a plurality of sections of a field of view of the antenna 24. In the illustrated embodiment of FIG. 1, the field of view of the antenna 24 corresponds to the sky and the corrective mapping is a gradient map of the sky with different correction values for different sections or portions of that field of view.

At 60, the processor 42 utilizes the corrective mapping to determine subsequent locations of the first vehicle 22 based on subsequently received satellite signals. The corrective mapping facilitates correcting the pseudo ranges of satellites appearing in respective sections of the field of view of the antenna 24 to provide more accurate vehicle location information.

Figure 3:
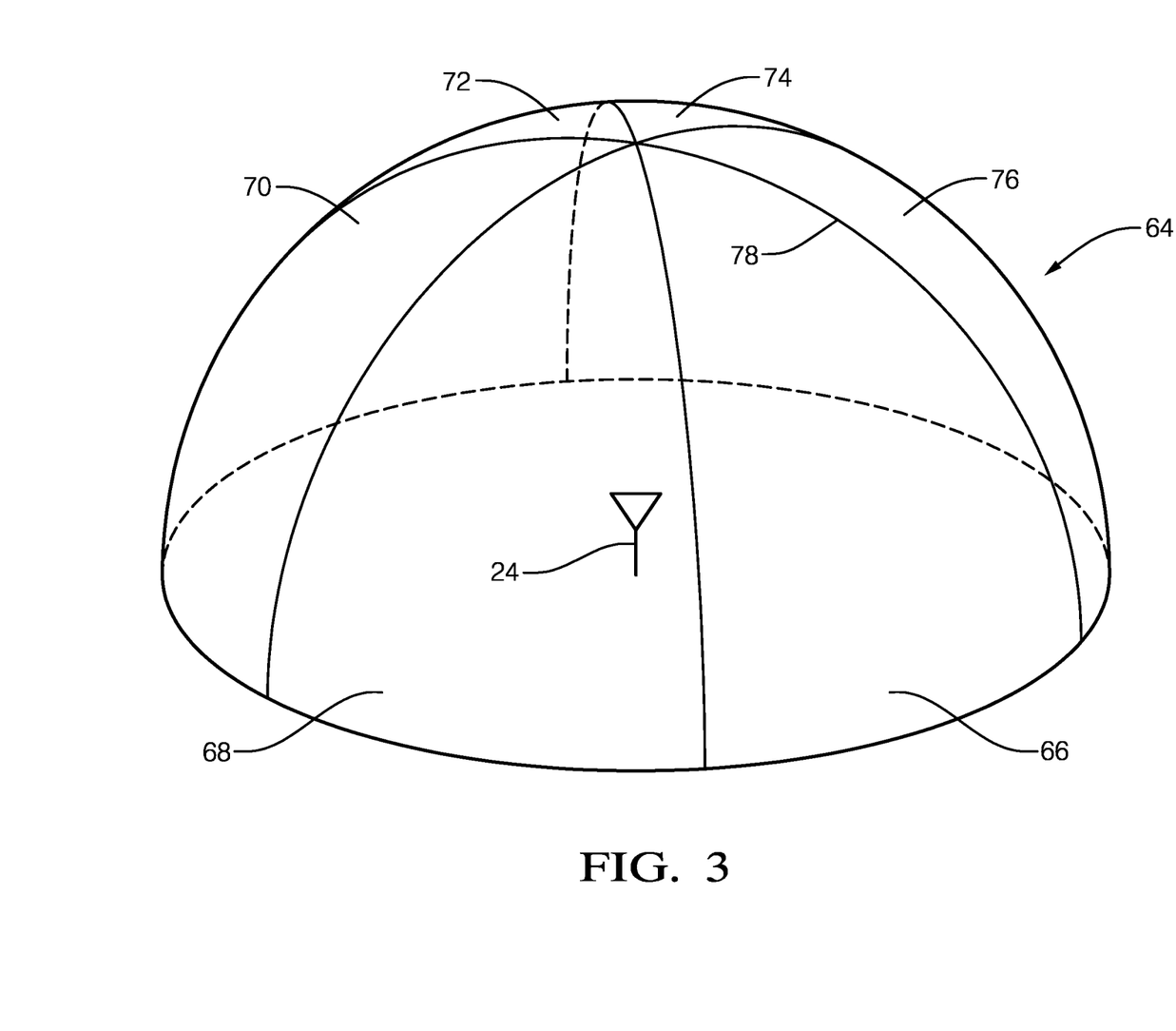
FIG. 3 schematically illustrates a corrective mapping feature of an example embodiment.

FIG. 3 schematically illustrates a corrective mapping technique according to an example embodiment. The antenna 24 has a field of view 64 corresponding to a view of the sky overhead the antenna 24. For discussion purposes, the field of view 64 is divided into sections 66, 68, 70, 72, 74 and 76. Each of those sections corresponds to a portion of the sky overhead the vehicle location and has a respective correction factor that is utilized by the processor 42 for correcting a pseudo range determined from a satellite detected within a corresponding one of the sections 66-76. The locations of the sections 66-76 can be considered relative to an earth-centered reference frame such that they do not rotate about the center of the field of view 64 as the vehicle turns. In other words, the sections 66-76 of the sky stay in the same heading.

The lines between the sections 66-76 in FIG. 3 are for illustration and discussion purposes to visualize a corrective mapping of the field of view 64. Those lines do not represent any physical demarcation between the sections. Many embodiments will include sections that are also segregated longitudinally with different sections corresponding to different angles above the horizon but such divisions are not shown for simplicity of illustration.

The corrective mapping 64 in this example includes a respective correction factor for each section and at least two of the sections 66-76 have correction factors that are different from each other. For example, the direction of movement of the first vehicle 22 can affect the type of atmospheric delay or error associated with a received satellite signal based on the known GNSS pull effect. Having different correction factors or values for different sections 66-76 of the field of view 64 addresses the different ways in which satellite signals may be delayed depending on the location and direction of movement of the first vehicle 22. For example, GNSS satellite signals may have differential error based on the different conditions of the atmosphere through which those signals travel.

While the vehicles 22 and 32 are within range and communicating position data the corrected first vehicle location can be determined using the individual pseudo ranges from the currently visible satellites. In an example embodiment, correcting pseudo ranges begins with satellites in a section or sections closest to 180° of the direction of the positional variance. As the satellite signals slowdown from ionospheric and tropospheric interference, the satellites in the opposite direction of the variance contribute the most to the error.

The corrective mapping facilitates corrections based on where a satellite appears in the sky, which will be in one of the sections 66-76. The mapping allows for correcting pseudo range information for different satellites that appear in a section where another satellite may have been visible. Satellites in the same section, which may not all appear simultaneously, will have a very similar correction factor.

The processor 42 is configured or otherwise programmed to utilize a corrective mapping for a limited amount of time. The correction factors of the respective sections of the corrective mapping will tend to degrade in usefulness over time as the vehicle moves and as atmospheric conditions differ. For example, the amount of free ions in the ionosphere are always slowly changing. The corrections for any satellite appearing in a particular section will be the same at the same moment in time. Within a certain amount of time, the respective corrections will be very similar but only for a limited amount of time. In the illustrative example, the processor 42 is configured to either update the corrective mapping, reducing the influence of the correction factors over time, or dismiss the corrective mapping after an appropriate amount of time has passed since the corrective mapping was determined. The processor 42 updates a corrective mapping based upon a subsequently received communication from a second vehicle, a corresponding determined positional relationship and satellite signals in the same manner as described above.

One feature of the illustrated example embodiment is that the correction factor varies within or across a section to provide a gradient effect or smoothing of the correction factors between adjacent sections that have different correction factors. For example, the correction factor for the section 66 varies between a value near a center of the section 66 to a different value near a transition 78 between the section 66 and the section 76. In this example, the value of the correction factor progressively changes to become more close to the correction factor within the section 76 as a position within the section 66 approaches the transition 78.

Figure 4:
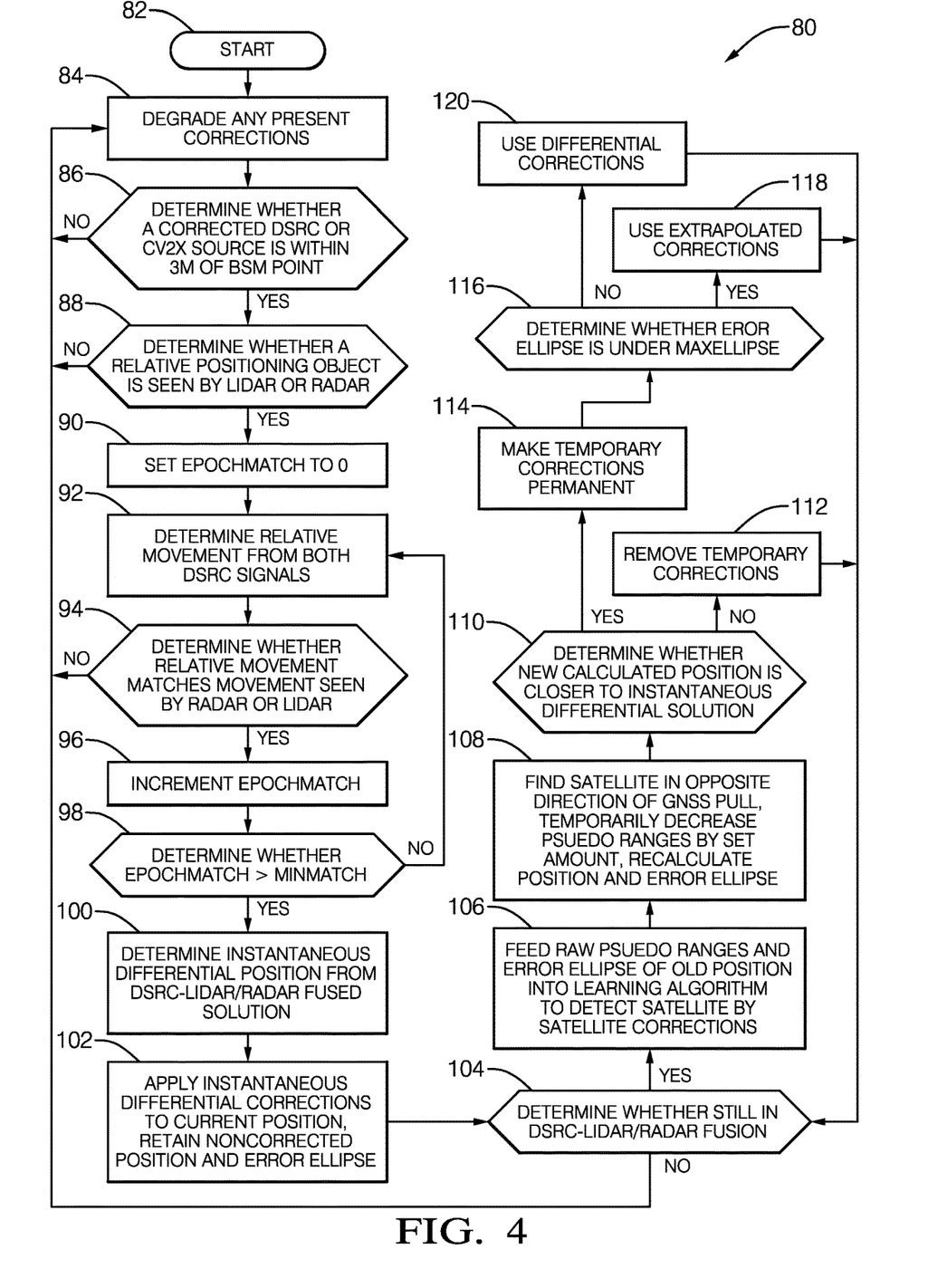
FIG. 4 is a flow chart diagram illustrating an example embodiment of a method of processing satellite and vehicle-to-vehicle communications for determining vehicle location information.

FIG. 4 includes a flowchart diagram 80 that describes an example process for determining location information and a corrective mapping. The process in FIG. 4 begins at 82 which may be an initialization of the system 20 or at the expiration of the useful time for a previously determined corrective mapping. At 84, an existing corrective mapping is dismissed and the correction factors for the various sections of the corrective mapping are degraded or otherwise removed from the memory used by the processor 42.

At 86, the processor 42 determines whether there is a corrected DSRC or CV2X source within a preselected range of the first vehicle 22. In this example, a determination is made at 86 whether such a source, such as the second vehicle 32, is within three meters of the current location of the first vehicle 22. If not, the process proceeds to the step at 84.

When there is an available source, such as the second vehicle 32, that meets the criteria of the decision at 86, another decision is made by the processor 42 whether the detector 40 detects an object at the approximate location of the source identified at 86. This occurs at 88. If the determination at 88 is negative, the process returns to the step at 84. If the determination at 88 is positive, then an epoch match value is set to zero at 90. At 92, a positional relationship between the first vehicle 22 and the second vehicle 32 is determined including calculating relative movement based on the DSRC signal information for both vehicles. At 94, a determination is made whether the relative movement based on the DSRC signal information matches relative movement detected by the detector 40 to confirm that the source of the DSRC or CV2X signal is the same as the object detected by the detector 40. If there is no match at 94, the process returns to the step at 84. If there is a match at 94, then the epoch match is incremented at 96.

At 98, the value of the epoch match is compared to a minimum required match value. If the current epoch match value is not above that minimum, the process returns to the step at 92. If the epoch match value is above the minimum, that indicates that the information from the detector 40 and the location information based on the communication received from the second vehicle 32 are reliable because there has been a match for a sufficiently long period of time.

When there is a sufficient match, the processor 42 calculates an instantaneous differential position based upon the communication received from the second vehicle and the information from the detector 40 at 100. The differential position information determined at 100 indicates whether a correction is needed regarding the location information for the first vehicle 22. At 102, the processor 42 applies the instantaneous differential correction information determined at 100 to the current location information for the first vehicle 22. The processor 42 also retains the non-corrected location information and an error ellipse, which shows all the possible real locations of the receiver in a manner known in the art of GNSS.

At 104, the processor 42 determines whether the source of the DSRC or CV2X communication is still within an appropriate range and detected by the detector 40. In this embodiment, when those conditions are satisfied it can be considered a V2V-detector fusion. If that fusion condition does not exist at 104, the process returns to the step at 84. When there is appropriate fusion, the processor 42 utilizes a learning algorithm to determine correction factors for currently detected satellites based upon the raw pseudo ranges from currently received satellite signals and the error ellipse of the uncorrected location. At 108, the processor 42 determines which of the detected satellites is in an opposite direction of GNSS pull and temporarily decreases the pseudo ranges by a predetermined amount. The processor 42 also recalculates the vehicle position and the error ellipse at 108.

At 110, the processor 42 determines whether the correction information is reliable by determining whether the calculated vehicle location at 108 is closer to the instantaneous differential solution from the steps 100 and 102. If the newly determined vehicle location is not closer to that instantaneous differential solution, then the temporary corrections are removed at 112. If, on the other hand, the newly determined vehicle location is closer to the instantaneous differential solution, then the temporary corrections are considered permanent for a new corrective mapping of the field of view of the satellite receiver of the system 20.

At 116, the processor 42 determines whether the error ellipse satisfies a criteria that corresponds to a maximum designed ellipse size. If the error ellipse is less than the maximum, the corrections that were made permanent at 114 are used as extrapolated corrections at 118. If, on the other hand, the error ellipse is equal to or greater than the allowable maximum, the differential corrections are used at 120.

The example process shown in FIG. 4 illustrates how various checks and determinations are made during a process such as that illustrated in the flowchart 44 of FIG. 2 to ensure that reliable information is being used for correcting the location information regarding the first vehicle 22 and for developing a corrective mapping.

Embodiments such as that described above and illustrated in the drawings provide enhanced vehicle location information by utilizing a corrective mapping that accounts for potential differential error in received GNSS satellite signals to correct errors that may occur in a vehicle location determination. Such errors may result from the differential error in the GNSS satellite signals. Utilizing a corrective mapping based on information from another vehicle and location information determined from received satellite signals facilitates more accurate subsequent vehicle location determinations for an appropriate amount of time. Updating or dismissing a corrective mapping within an appropriate amount of time facilitates continued accuracy in vehicle location determinations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system for determining vehicle location information, the system comprising:
   at least one receiver that is configured to be supported on a first vehicle, the at least one receiver being configured to receive a communication from a second vehicle and a signal from each of a plurality of satellites;
   at least one detector supported on the first vehicle, the at least one detector being configured to detect a positional relationship between the first vehicle and the second vehicle; and
   at least one processor associated with the first vehicle, the at least one processor being configured to determine
      a location of the first vehicle based on satellite signals received by the at least one receiver,
      a location of the second vehicle based on the communication received by the at least one receiver,
      a corrected location of the first vehicle based on the location of the second vehicle and the positional relationship between the first vehicle and the second vehicle, and
      a corrective gradient mapping of a plurality of sections of the sky within a field of view of the at least one receiver, the corrective gradient mapping having an associated correction factor for each of the sections that the at least one processor uses to correct for atmospheric delay of satellite signals received from satellites appearing in the respective sections when determining a subsequent location of the first vehicle based on the satellite signals.

2. The system of claim 1, wherein the associated correction factor for a first one of the sections is different than the associated correction factor for a second one of the sections.

3. The system of claim 1, wherein
   the at least one receiver comprises a first antenna for receiving the communication from the second vehicle and a second antenna for receiving the signal from each of the plurality of satellites; and
   the corrective mapping is for the field of view of the second antenna.

4. The system of claim 1, wherein the communication from the second vehicle includes an indication of: the location of the second vehicle, a reliability of the location of the second vehicle, a speed of the second vehicle, a size of the second vehicle, and a shape of at least a portion of the second vehicle.

5. The system of claim 1, wherein the communication from the second vehicle comprises a basic safety message (BSM) that includes an indication of a reliability of the location of the second vehicle.

6. The system of claim 1, wherein the at least one detector comprises at least one of a RADAR detector, a LIDAR detector, a vision based detector, or an ultrasound detector.

7. The system of claim 1, wherein the at least one processor
   updates the corrective gradient mapping based on a subsequently determined location of the first vehicle based on subsequently received satellite signals, a subsequently determined location of the second vehicle based on a subsequently received communication from the second vehicle, and a subsequently determined corrected location of the first vehicle; and
   replaces the corrective gradient mapping with the updated corrective gradient mapping.

8. The system of claim 7, wherein the at least one processor either updates or dismisses the corrective gradient mapping within a predetermined time.

9. The system of claim 1, wherein
   the associated correction factors each have a value;
   the value of the associated correction factor varies across the respective section;
   the value of the associated correction factor for a first one of the sections gradually changes toward a value of the associated correction factor for a second one of the sections near a transition between the first one of the sections and the second one of the sections; and
   the second one of the sections is adjacent the first one of the sections.

10. The system of claim 1, wherein the at least one processor determines whether the second vehicle is within a predetermined range of the first vehicle as a prerequisite to using the received communication from the second vehicle.

11. A method of determining location information of a first vehicle, the method comprising:
    receiving a communication from a second vehicle;
    receiving a signal from each of a plurality of satellites by at least one receiver associated with the first vehicle;
    detecting a positional relationship between the first vehicle and the second vehicle;
    determining a location of the first vehicle based on the received satellite signals;
    determining a location of the second vehicle based on the received communication;
    determining a corrected location of the first vehicle based on the location of the second vehicle and the positional relationship between the first vehicle and the second vehicle; and
    determining a corrective gradient mapping of a plurality of sections of the sky within a field of view of the at least one receiver, the corrective gradient mapping having an associated correction factor for each of the sections to correct for atmospheric delay of satellite signals received from satellites appearing in the respective sections when determining a subsequent location of the first vehicle based on the satellite signals.

12. The method of claim 11, wherein the associated correction factor for a first one of the sections is different than the associated correction factor for a second one of the sections.

13. The method of claim 11, wherein the communication from the second vehicle includes an indication of: the location of the second vehicle, a reliability of the location of the second vehicle, a speed of the second vehicle, a size of the second vehicle, and a shape of at least a portion of the second vehicle.

14. The method of claim 11, wherein the communication from the second vehicle comprises a basic safety message (BSM) that includes an indication of a reliability of the location of the second vehicle.

15. The method of claim 11, comprising
    updating the corrective gradient mapping based on a subsequently determined location of the first vehicle based on subsequently received satellite signals, a subsequently determined location of the second vehicle based on a subsequently received communication from the second vehicle, and a subsequently determined corrected location of the first vehicle; and
    replacing the corrective gradient mapping with the updated corrective gradient mapping.

16. The method of claim 15, comprising either updating or dismissing the corrective gradient mapping within a predetermined time.

17. The method of claim 11, wherein
the associated correction factors each have a value;
the value of the associated correction factor varies across the respective section;
the value of the associated correction factor for a first one of the sections gradually changes toward a value of the associated correction factor for a second one of the sections near a transition between the first one of the sections and the second one of the sections; and
the second one of the sections is adjacent the first one of the sections.

18. The method of claim 11, comprising determining whether the second vehicle is within a predetermined range of the first vehicle as a prerequisite to using the received communication from the second vehicle.

19. A system for determining vehicle location information, the system comprising:
receiver means, configured to be supported on a first vehicle, for receiving a communication from a second vehicle and a signal from each of a plurality of satellites;
detector means, supported on the first vehicle, for detecting a positional relationship between the first vehicle and the second vehicle; and
means, associated with the first vehicle, for determining:
a location of the first vehicle based on satellite signals received by the receiver means,
a location of the second vehicle based on the communication received by the receiver means,
a corrected location of the first vehicle based on the location of the second vehicle and the positional relationship between the first vehicle and the second vehicle, and a corrective gradient mapping of a plurality of sections of the sky within a field of view of the receiver means, the corrective gradient mapping having an associated correction factor for each of the sections that the means for determining uses to correct for atmospheric delay of satellite signals received from satellites appearing in the respective sections when determining a subsequent location of the first vehicle based on the satellite signals.

20. The system of claim 19, wherein the means for determining is further for
determining whether the second vehicle is within a predetermined range of the first vehicle as a prerequisite to using the received communication from the second vehicle; and
either updating or dismissing the corrective gradient mapping within a predetermined time.

\* \* \* \* \*